United States Patent [19]

Silverman

[11] 3,774,172

[45] Nov. 20, 1973

[54] RANDOM ACCESS MULTIPLE DISC OPTICAL INFORMATION STORAGE SYSTEM

[76] Inventor: Daniel Silverman, 5969 S. Birmingham, Tulsa, Okla. 74105

[22] Filed: Mar. 23, 1972

[21] Appl. No.: 237,571

Related U.S. Application Data

[63] Continuation of Ser. No. 888,461, Dec. 29, 1969, abandoned.

[52] U.S. Cl. .................................... 340/173 LM, 250/219 DD, 340/173 LT, 340/174 YC, 340/174.1 C

[51] Int. Cl. .......................... G11c 5/04, G11c 13/04

[58] Field of Search ................ 250/219 DD; 279/44; 340/174.1 C, 173 LT, 173 LM, 174 YC; 179/100.2 MD, 100.2 Z; 274/10 B

[56] References Cited

UNITED STATES PATENTS

| | | | |
|---|---|---|---|
| 3,553,662 | 1/1971 | Goss | 340/174.1 |
| 3,205,484 | 9/1965 | Schwertz | 340/173 LM |
| 3,636,529 | 1/1972 | Borner | 340/173 LM |
| R26,901 | 5/1970 | Dove | 340/173 LM |
| 1,885,005 | 10/1932 | Daily | 274/10 B |
| 3,148,354 | 9/1964 | Schaffert | 340/173 LT |
| 3,158,844 | 11/1964 | Bowdle | 340/174.1 |
| 1,341,751 | 6/1920 | Krauss | 274/10 B |
| 3,226,696 | 12/1965 | Dove | 340/173 LM |
| 3,573,471 | 4/1971 | Kolb | 340/173 LM |

*Primary Examiner*—Vincent P. Canney
*Assistant Examiner*—Stuart Hecker

[57] ABSTRACT

A plurality of rotating disc storage media are precisely positioned with respect to a central movable arm and transducer such that the transducer can be selectively and sequentially positioned to a desired track on a desired disc in the group of discs. A second group of discs, positioned on the same rotators as the first group are contacted by a second arm and transducer. The first transducer can be reading or writing on a disc in the first group while the second transducer is being positioned to a desired track on a desired disc in the second group. Thus the time required to move the transducer is not lost since another transducer is reading or writing simultaneously. This storage is particularly adapted for high packing density optical storage means whereby a very large storage volume can be rapidly accessed on a random basis.

11 Claims, 17 Drawing Figures

INVENTOR.

Daniel Silverman

INVENTOR.

Daniel Silverman

RANDOM ACCESS MULTIPLE DISC OPTICAL INFORMATION STORAGE SYSTEM

CROSS-REFERENCE TO RELATED APPLICATIONS

This is a continuation of U.S. Pat. application Ser. No. 888,461, filed Dec. 29, 1969, now abandoned.

This invention is a continuation-in-part of my copending U.S. Pat. application Ser. No. 304,789 entitled "Digital Microfilm Apparatus," filed Aug. 27, 1963, now U.S. Pat. No. 3,523,183, and my copending U.S. Pat. application Ser. No. 304,789, was a continuation-in-part of my copending U.S. Pat. application Ser. No. 158,000 filed Dec. 8, 1961 entitled Microfilm Apparatus, now U.S. Pat. No. 3,179,001. It is related to my U.S. Pat. No. 3,423,743. U.S. Pat. No. 3,523,183 and 3,179,001 are incorporated into this application by reference.

BACKGROUND OF THE INVENTION

1. Field of the Invention

This invention is concerned with the storage and retrieval of information. More particularly it is concerned with the storage and rapid random retrievel of information stored in digital form at high packing density on a record medium. More particularly it is concerned with the storage of information on the surfaces of rotating discs, the information being stored as spots in arrays of spots arranged in circular tracks on the surface of said discs.

2. Description of the Prior Art

In the prior art considerable use has been made in magnetic digital storage systems of multiple rotating discs with magnetic coatings on the discs, and with separate transducer heads associated with each surface of each disc. The heads are mounted on arms such that the heads can be moved radially along the surface of the discs so that they successively contact different tracks at different radii. However, the same single head is always in contact with the same disc surface. While the disc storage medium is advantageous in that it carries a large volume of information at higher packing density than can be provided on tapes, and the information storage can be entered on a random basis, it is still of relatively limited storage capacity, and many discs must be used to obtain a practical volume of storage. This requires a great number of separately movable arms and transducers, or heads, which must be precisely constructed and are expensive to manufacture.

SUMMARY OF THE INVENTION

In this invention I expand the concept to a plurality of discs, (called a group) which are arranged in precise geometrical relation to a central movable arm carrying a transducer. Thus instead of a single arm and transducer contacting only one disc surface, by my invention it may sequentially contact as many as 12 or more. Of course a second movable arm and transducer can be provided to sequentially contact a second group of 12 disc surfaces, on discs mounted on the same or different rotators, and so on. Of course, the time required for the single transducer head to move from a first disc to a second disc is greater in this invention than it is in current useage where all that is required is to switch the central processing unit from one head on one arm to a new head on another arm. Of course, the new head must be positioned to the desired track, and this delay is only slightly less than in the invention since in this invention the head can be moving to its new radius while the arm is being moved to the new disc. And, of course, a second head on a second arm can be reading another disc during the period that the first arm is moving to a new disc.

While this invention as broadly described above has advantages over the present art, and can be used for a large variety of storage systems of the magnetic and optical variety, the real advantage of this invention lies in optical storage systems having very high packing density, where the transducer systems are very complex and expensive. Thus, using laser recording and reading on strips it has been reported that of the order of $10^7$ bits can be recorded per square inch. Applying this packing density to discs, it is possible to use say 10 surfaces on each of six rotators, having a total of 60 working surfaces, contacted by five arms and transducers, which will have a storage capacity 240 times as great as for a conventional magnetic disc system with 160 rotating surfaces and 160 movable arms and transducers, with equivalent access time. On a disc-for-disc basis, this invention permits storage up to 600 times as great per disc with one twenty-fifth as many arms and transducers, compared to conventional magnetic storage systems.

This invention broadens the concept of my copending application and patents referred to above, to the use of a plurality of rotating discs (called a group), in a plurality of specially positioned disc rotating devices or rotators. One or more movable transducer devices are provided that are mounted on movable arms or carriers and can be moved from operating relation with discs on one rotator to other discs on the same or different rotators, to the end that each transducer means can be selectively and successively placed in operating relation with each of a plurality of disc records in a specific group. Simultaneously another transducer means can similarly be placed in operating relation with each of another plurality of discs on another group. It is also possible for two arms and transducers to independently contact each disc of a plurality of discs. The transducers can read and/or write.

Although, in general, facilities are only provided for reading out (to another system) from one disc at one time, I contemplate that when one transducer means is reading out, a second transducer can be selectively positioned to a predetermined position on a predetermined disc. Also, I contemplate that so long as the digital data is not being read out (to another system) the data being read by one transducer can be recorded by another transducer on another disc in the same or another group of discs.

A principal object of this invention is thus to provide a rotating disc digital data storage system that can record, and store data at high packing density, and can rapidly gain random access to the data and read it out. It is also an important object to have a very large storage capacity that can be accessed very rapidly. It is also an important object of this invention to have a large volume of information accessed with a minimum of moving apparatus. These and other objects and details of this invention will become clear from the following description taken in conjunction with the attached drawings, in which:

DESCRIPTION OF THE PREFERRED EMBODIMENTS

Figures 1, 2, 3A, 3B, 4A, 4B:
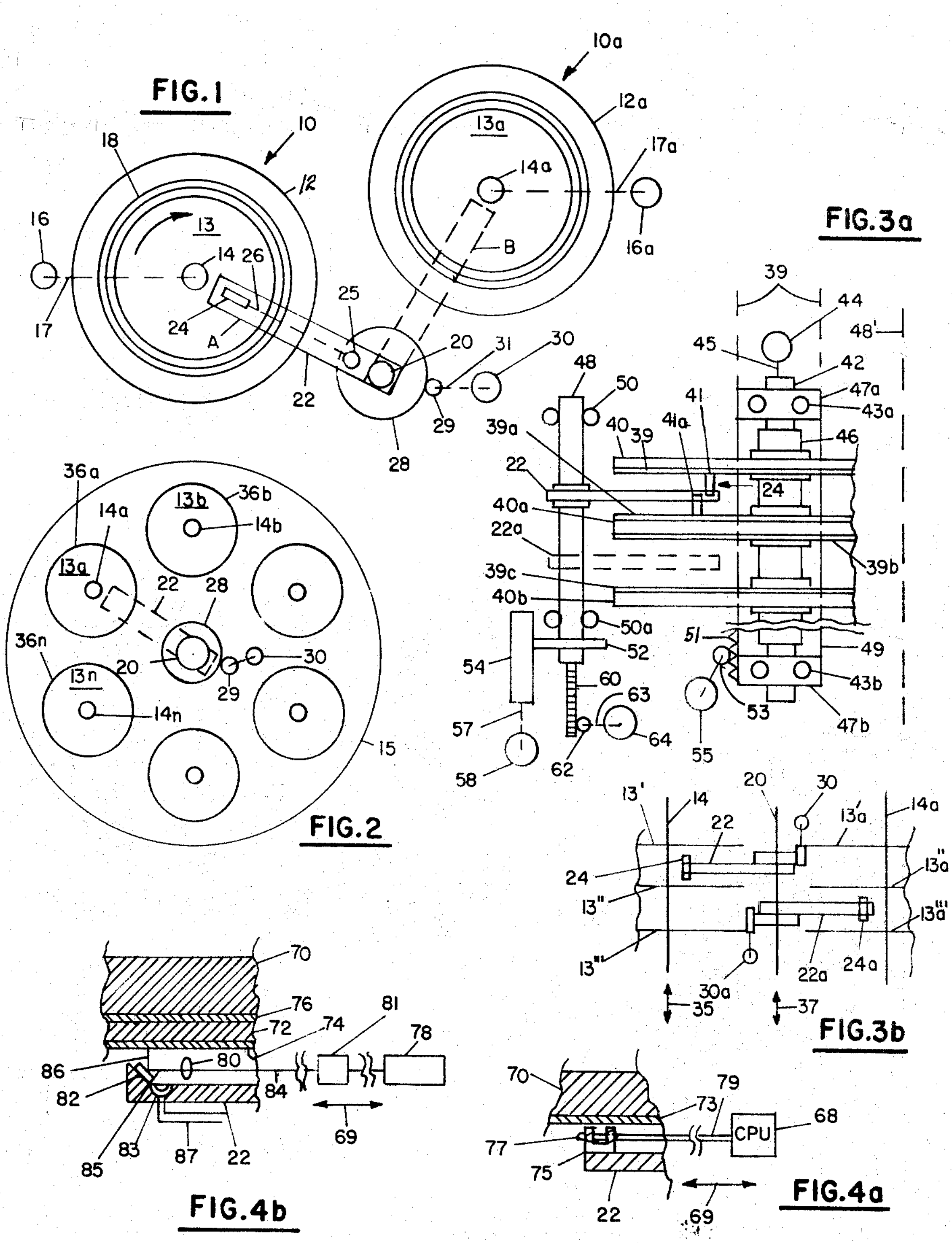
FIGS. 1 and 2 illustrate schematically multiple rotator systems, FIG. 1 with two rotators, and FIG. 2 with four.
FIG. 3*a* illustrates a single rotator multiple disc system with a single central accessing arm and transducer.
FIG. 3*b* illustrates multiple arms and transducers for accessing the same discs on multiple rotators.
FIGS. 4*a*, 4*b* illustrate respectively magnetic and optical recording and reading.

Referring now to the drawings, and in particular to FIG. 1, I show two disc assemblies 10 and 10*a* comprising discs 12, 12mounted on vertical shafts 14, 14*a* driven at constant speed by motors 16, 16*a*, and having information recorded on record sheets 13, 13*a* on the surfaces of discs 12, 12*a*. Such information is recorded in the form of spots or areas, arranged in arrays, such as circular tracks 18, 18*a*. The record material 13, 13*a* is of such a character that it can be modified in small areas or spots to be of a different character than the original record medium that can be recognized as different from that of the record medium. The presence or absence of spots of modified character in the arrays represents the information recorded.

Transducer means 24 is movably mounted along arm 22 which can be positioned in radial relations A, B with the two discs 12, 12*a*, respectively. The arm 22 is rotatably mounted on vertical post or shaft 20, and is rotatable by means of gear 28, pinion 29 and motor 30. The transducer 24 is adapted to move along the arm 22 by means 26 and motor 25 so that the transducer 24 can be placed in operating relation with each of the circular tracks 18, 18*a* in any desired sequence. More detail on each of these elements will be provided in connection with other figures.

In FIG. 2 I show a group of 6 discs, 36*a*, 36*b*, – 36*n* placed in circular symmetrical positions with respect to the axis 20 of the rotating arm 22, so that the transducer 24 can be placed in operating relation with each of the discs 36. While it is not shown, it will be clear that all of the vertical shafts 14 are parallel, and preferably mounted on the same base support 15, and that the planes of the separate surfaces 13 will all lie in the same plane, parallel to the plane of rotation of the arm 22. Thus, it will be clear that any number, *n*, of a plurality of discs with recording material on their surfaces can be used as a group, which can sequentially and selectively be placed in operating relation to the transducer 24 on the arm 22.

In FIG. 3*a* I show alternatively that the plurality of discs that comprise the group that can be placed in operating relation to the arm and transducer, can be in vertical (as well as horizontal) relation to each other. I show a rotating shaft 42 mounted in bearings 43*a*, 43*b* in brackets 47*a*, 47*b* respectively, mounted on base 49. The shaft is driven by motor 44. Mounted on the shaft 42 in fixed spaced relation are a plurality of discs 40, 40*a*, etc. These discs can be in permanent mounting or preferably in removable mounting, singly, or as a group, such as is now common practice in the magnetic recording field. These discs 40, 40*a*, have recording material 39, 39*a* respectivey on their surfaces.

A movable arm 22 is mounted on shaft 48 held in bearings 50 so that the shaft can be rotated by means of gear 52 and long pinion 54 driven by motor 58. The shaft 48 can also be translated by means of the cylindrical rack 60, pinion 62 and motor 64. Of course, as is well known in the art the shaft 48 in bearings 50 can be mounted on a base (like 49) and the base with shaft translated in the axial direction. Thus it will be clear that the arm 22 can be in radial position between discs 40, 40*a*, and can be turned by an angle to be outside the contour of the discs, moved to position 22*a*, and then turned back into radial alignment. In FIG. 3*a* I show also, schematically, that the transducer 24 can be placed alternatively into operating relation 41, 41*a* with either of the surfaces 39 and 39*a*, at will, without moving the arm.

It will be clear from FIG. 3*a* that a second central arm similar to 22 can be placed on the opposite side of the discs 40 for example in position 48' or in position 20*a* of FIG. 1, and can independently be placed in operating relation with each of the discs 40. Thus it is possible to simultaneously read from and to write on a single disc with two transducers on two arms.

In FIG. 3*b* I show schematically a variation of FIG. 3*a* in which two rotators 14, 14*a* carry a plurality of discs 13', 13'', 13''' on rotator 14 and 13*a'*, 13*a''* and 13*a'''* on rotator 14*a*. Disc faces 13', 13'' and 13*a'*, 13*a''* are in a first group contacted by a transducer 24 on arm 22 driven by motor 30. Disc faces 13'', 13''' and 13*a''*, 13*a'''* are in a second group of discs contacted by a second transducer 24*a* on arm 22*a* driven by motor 30*a*. Thus, extending this principle there can be multiple systems, each system comprising a group of discs (disc faces) which can be contacted by a single central transducer on a central transducer carrier. Each of the separate systems operate independently. However, where the central processing means can handle only a single stream of digital information only one transducer can be reading out of the system or writing in, the other transducers (in other systems) can be simultaneously positioned to new disc addresses. A special condition arises where the information is not being read "out of the storage system," then, one transducer can be reading one disc, while the same information is being recorded on another disc by another transducer.

Extending the system of FIG. 3*b* further it would be possible to have n discs with ($2n-2$) faces carrying data, and ($n-1$) arms and transducers, one in each of the inter disc space. However, a much simpler system is indicated in FIG. 3*a* where I have shown the base 49 that supports the shaft 42 and discs 40 as moving between guides in the direction of the axis of rotation of the discs. Then by means of rack 51, pinion 53 and motor 55, the base supporting the shaft with discs can be translated axially so that without moving the arm 22 longitudinally it can be placed in operating relation with each of the disc faces. Thus, relative longitudinal movement of the arm or the discs will permit a single transducer to contact all of the discs in all of the rotators. Or, if desired, two independent arms can be used so that when one arm is reading or writing on one disc in one rotator, the other arm can be positioned to any other disc in any other rotator, by translating the discs to the proper axial position and rotating the arm to the proper rotator. Also, since each arm can independently reach each disc it is possible to read and write on all discs by having only a single writing transducer on one arm and only a single reading transducer on the other arm.

It will be clear thus far that this invention is concerned with a storage system in which a transducer means can selectively and sequentially be placed in operating relation with a plurality of recording media on the surface of rotating discs. There must be geometrical symmetry between the transducer and the discs, and the discs can be in the same or different planes and can be contacted by moving the arm or carrier in an appropriate manner.

I wll now proceed to discuss in more detail the types of recording media and processes of recording and reading that can be employed in this invention.

I contemplate a recording medium in which the spots can be created on the medium in one location and the medium applied to a disc in another location. Also, the medium can be applied to a disc which is then placed in this apparatus and the data recorded on the medium. For convenience I will call the rotating shaft means a rotator. Thus FIG. 1 has 2 rotators, FIG. 2 has 6 and FIG. 3*a* has 1. The discs can be arranged in packs in which they are all mounted on a tubular means 46, FIG. 3*a* for example, which is itself removable from the shaft 42. The recording medium can be magnetic or optical. In the area of optical records I contemplate that the records can be photographic (such as the silver halide film), thermochromic, electrographic, Xerographic, etc. Also I contemplate a record in which a high intensity beam of radiation is used to heat and alter, or evaporate, a thin film of material on the surface. One such material is described in the patent issued to P. A. Aken U. S. Pat. No. 3,181,170 – as a film of cadmium or coatings of anthracene or other suitable plastics. Also C. H. Becker in his U. S. Pat. No. 3,314,073 specifies suitable materials as any appropriate layer of uniform density, such as a developed silver halide emulsion, or dyed gelatin, or india ink, etc. I contemplate also using a material such as Kalvar, which is a photographic film, recorded upon by ultraviolet light, and fixed by heating. This film is made by the Kalvar Corp. of New Orleans, La. I would pre-expose and record the entire record area with ultra-violet light, and then spot fix the film with a beam of intense radiation, suitably controlled as will be discussed below. Such a beam can be that of a laser with suitable light modulating means, all of which is well known in the art.

In FIGS. 4*a* and 4*b* I show schematically how magnetic and optical storage of data might be utilized in this invention. FIG. 4*a* shows a portion of a disc 70 with magnetizable coating 73 applied to its surface. In operating relation to the surface of the coating 73 is a magnetic transducer 75 with winding 77 and leads 79, mounted on arm 22 with the air gap in proper spacing from 73. The arm 22 is adapted to move the transducer 75 to any desired value of radius on the disc, along a radial line in the direction of arrows 69. As is well known in the art, the transducer 75 can be connected by leads 79 to a digital computer or central processing unit 68 and can, by well known electronic means, be made to record and/or to read magnetic digital spot recordings on the medium 73. Since the magnetic spot recordings can be erased and re-recorded, the medium 73 can be permanently fastened to and made a part of the disc 70.

In FIG. 4*b* I show schematically an embodiment in which the transducer is an optical device and with a suitable recording medium can record and/or read optical spots on the record. This will be discussed more fully in connection with FIG. 5. For the purpose of describing FIG. 4*b* I will assume that the transducer is an optical beam 84 from a laser 78 that passes through a focusing lens 80 and is deflected by mirror 82 until the focused beam 86 impinges on the record medium 74. As in FIG. 4*a* the disc is 70, the record material is 72 which is fastened to the surface of 70 by adhesive means 76. On the surface of record 72 is a reflective coating 74 that has a plurality of perforations or alterations of the reflective coating representing the data recorded. Light from beam 86 when it strikes unaltered (reflective) coating 74 will reflect light back to photoelectric means 83 (such as a photocell, photomultiplier, photo-resistive means, etc.) which will provide a signal on leads 87 that will vary from time to time as the disc 70 turns and spots of reflecting or non-reflecting character pass under the beam 86. With a suitable laser 78 that can provide a beam of suitable intensity, and with a light modulator 81 such as a Pockels cell or similar device, well known in the art, and with a suitable record medium 72, the beam 86 can be utilized to burn, evaporate or otherwise modify the reflective coating 74 so as to provide the spots of altered properties. To do this the modulator 81 controls the beam 84 such as to provide an array of modified spots in accordance with the information to be recorded.

Figures 5A, 5B, 5C, 5D, 5E, 6A, 6B, 6C, 7A, 7B, 7C:
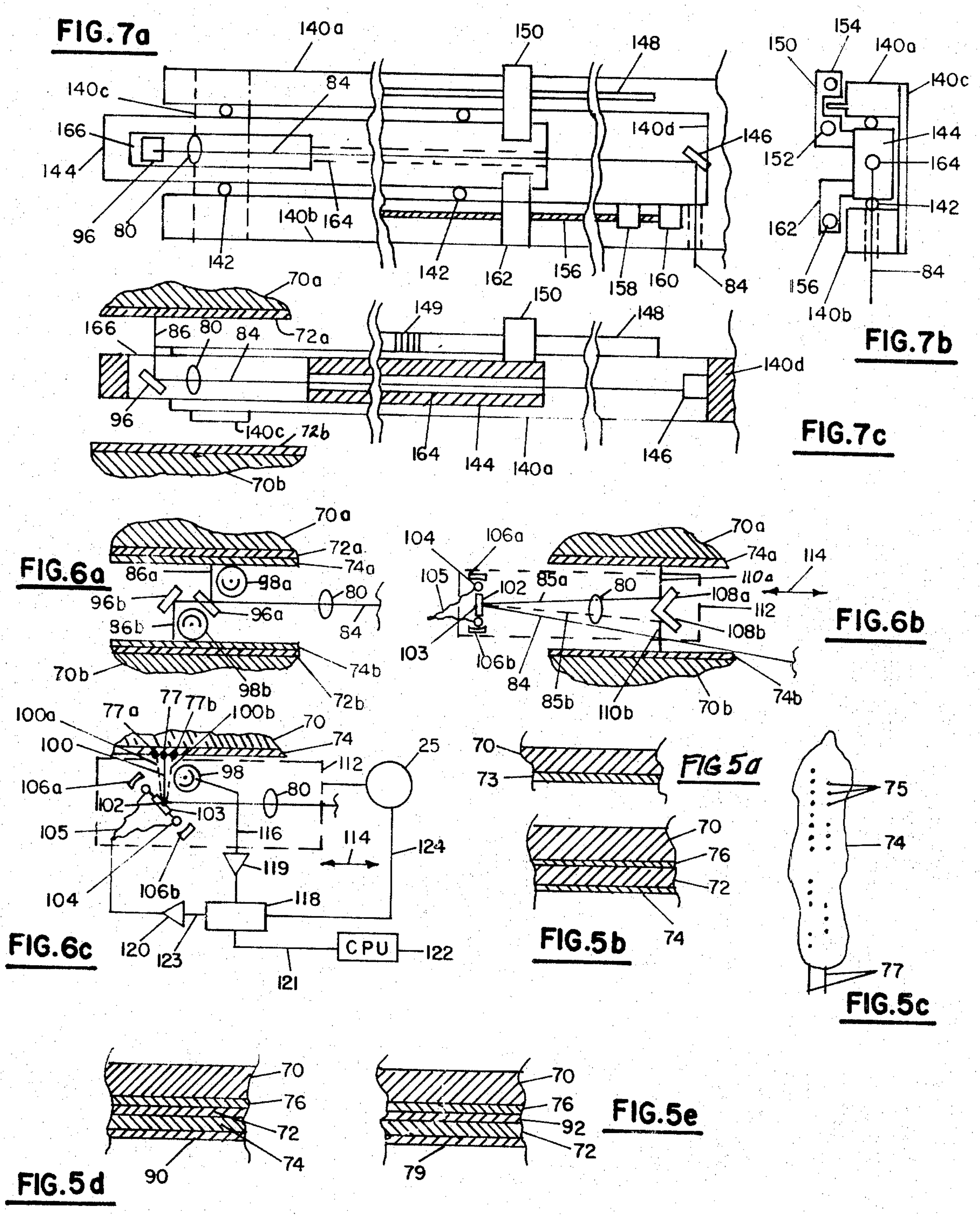
FIGS. 5*a*, 5*b*, 5*c*, 5*d* and 5*e* illustrate various embodiments of recording media.
FIGS. 6*a*, 6*b* and 6*c* illustrate various embodiments of optical reading systems.
FIGS. 7*a*, 7*b* and 7*c* illustrate three views of one embodiment of a central transducer carrier system.

In FIGS. 5*a*, 5*b*, 5*c*, 5*d*, and 5*e*, I show several embodiments of records which can be used in this invention. In FIG. 5*a* I show a magnetic record 73 (as in FIG. 4*a*) which is a thin film of magnetizable material applied to the surface of the disc 70. In FIG. 5*b* I show an optical record (as in FIG. 4*b*) in which the record medium 72 is mounted on (and attached to) the disc 70 by adhesive 76 or other means. The record 72 can be a sheet or web of plastic such as Milar, (which is well known in the art) with a suitable coating 74 on its surface. This coating is preferably a very thin layer of an evaporizable material such as a thin evaporated film of metal, such as aluminum. This reflective film 74 is ideal because there will be a large optical contrast between the film 74 and the spots where the film is removed. FIG. 5*c* indicates how this record might appear with the surface 74 and tracks 77 of spots 75. In FIG. 5*d* I show the same arrangement but with a second thin layer of Milar 90, which, of course, should be transparent. This coating 90 is provided for the purpose of protecting the record surface 74 from dust, dirt, friction or other forces that might cause it to be scratched or otherwise altered. The presence of the outer layer of transparent Milar is no hindrance to the passage of an intense beam of radiation which can be focused to a small spot on the surface of the evaporizable film 74, which can be vaporized to provide a small area or spot of non-reflective surface.

In FIG. 5*e* show a record mounted on and attached to the disc surface by means such as the adhesive 76. The record comprises a transparent plastic sheet 72, such as Milar, with a highly reflecting layer (such as evaporated metal film 92) on the back surface of the plastic 72. On the front surface of the plastic is a Kalvar emulsion 79. This is well known in the art and comprises a photographic material which is caused to change by ultraviolet light, and is fixed by heating, such as by infrared radiation, or other heating radiation. The action of the ultraviolet light is to cause very small light scattering centers to be formed which prevent the passage of light through the film. In other words, the Kalvar emulsion controls the passage of light, not by absorption, (as in the conventional photographic film) but by light scattering. With the film unexposed to ultraviolet light, visible light will pass through the emulsion 79 and plastic 72 and be reflected by the layer 92. Where the emulsion has been exposed, the light will not pass through the emulsion and will not be reflected. I propose to expose the entire record to ultraviolet light, and to fix it in localized spots by heating with a focused laser beam of suitable controlled intensity.

It will be clear also that the emulsion 79 of FIG. 5*e* can be a conventional silver halide emulsion such that when a spot is exposed and the film is developed, the reflective coating will be effective everywhere except where the emulsion has been exposed to light. Since chemical processing is required it would be necessary to prepare the record by recording the data tracks and then mounting it on the disc. This would be useful for certain types of stored data. The particular advantages of the types of records in FIGS. 5*b* and 5*e* (Kalvar) is that the data can be recorded on the record medium after the record is mounted on the disc, and no separate chemical processing is necessary.

I have explained in connection with FIGS. 5*b* and 5*e* how a beam of radiant energy can be used to record and/or read information on the record. In FIG. 6 I show further details of this apparatus. In FIG. 6*a* I show how a beam of radiation 84 (as from laser 78 FIG. 4*b*) can scan either of two records 74*a*, 74*b* mounted respectively on two parallel discs 70*a*, 70*b*. The beam 84 passes through optics 80, to semi-transparent mirror 96*a* where part of the light goes to the record 74*a* and part of the light passes through mirror 96*a* to mirror 96*b* where it goes to record 74*b* mounted on the facing surface of disc 70*b*. Not shown, but well known in the art, would be a pair of removable masks in the paths of beams 86*a*, 86*b* so that only one or the other of the two records could be scanned at one time. Also shown are two photoelectric devices 98*a*, 98*b* for detecting the light reflected from the records 74*a*, 74*b* respectively.

In FIG. 6*b* I show another embodiment in which the beam 84 from the laser goes to rotatable mirror 102, which is suspended to rotate about axis 103 by means of coil 104 (shown in section) with leads 105. The coil 104 is suspended in the air gap of magnetic pole pieces 106*a*, 106*b*, so the reflected beam 85 can be displaced from 85*a* to 85*b* (shown dashed), both of which pass through optics 80. The beam 85*a* goes to fixed mirror 108*a* and then as beam 110*a* to record 74*a*, while beam 85*b* goes to mirror 108*b* and as beam 110*b* to record 74*b*. The assembly of mirrors 102, 108 and optics 80 (and photocells 98) are shown enclosed in the dashed rectangle 112 which is mounted on the arm 22, such that they move radially in the direction of the arrow 114.

In FIG. 6*c* I show the record 74 with a plurality of tracks 77 (shown in section). The various tracks 77*a*, 77, 77*b* etc. can be contacted by the beam 100 by moving the apparatus inside the rectangle 112 in the direction 114 by moving the arm 22. However, where the tracks are very closely spaced it may be difficult to adjust the position of the heavy arm 22 precisely enough. I have therefore shown how by the use of the rotatable mirror 102 (as shown in FIG. 6*b*) the position of the beam 100 can be rapidly and precisely positioned to 100*a*, 100*b*, etc. to read the particular track 77*a*, 77*b* as desired.

In practice, as is well known in the magnetic recording art, the individual tracks can be identified by a distinctive binary code so that, as the disc rotates and the data in a given track 77*a* (for example) is read, and the code indicates that the track is 77*a*, whereas the track 77*b* is desired, the beam can be deflected to position 100*b* where it will then read the code of track 77*b*. When this is verified, the data in track 77*b* can then be read and utilized.

In FIG. 6*c* I show schematically the reading means comprising the illuminating beam 100 and the reflection detection means 98. The detector 98 is connected to amplifier 119 and control 118. The control is connected by line 121 to the central processing unit or computer 122. I show also lead 123 from the control 118 to amplifier 120, and leads 105 to the coil on the rotatable mirror 102. Thus, when the CPU 122 has indicated to control 118 the desired track to be read, the control reads the track code and transmits it to the CPU which indicates the number of tracks to move to the desired track. The control 118 then sends instructions to arm positioning motor 25 and to mirror 102. Then when the proper track is found, the combination of beam 100, detector 98, control 118, and coil 104 form a servo system to keep the beam aligned with the track. The details of such servos are well known in the art and since the particular kind of servo does not form part of this invention, the details need not be described further. Suffice to say that as the disc rotates, the optical servo can keep the beam 100 positioned on the proper track.

In FIGS. 7*a*, 7*b*, 7*c* I show details of one embodiment of a transducer arm. This is for optical recording and/or reading and is based on the simple arrangement of FIG. 4*b*. The arm 22 comprises 2 parallel spaced rails 140*a*, 140*b*, fastened in spaced arrangement by brace 140*c*. Inside the space between the rails 140*a*, 140*b* is a sliding carrier 144 supported for longitudinal movement by bearings 142 as is well known in the art. The carrier 144 has a longitudinal bore 164 and a cut out portion 166 with lens 80 and mirror 96 mounted so that beam 84 from the laser can be reflected by mirror 146 to shine down the bore 164, through lens 80 to mirror 96 and as beam 86 to record 72*a*. A position encoder strip 148 with precisely spaced markings 149 is mounted on rail 140*a* and is read by lamp 152 and photocell 154 mounted on bracket 150 attached to carrier 144. The reading of the photocell 154 is utilized in a manner well known in the art to control the position of the carrier 144 so that the transducer beam will read a specific track.

The carrier is translated along the rails by means of lead screw 156 (or other well known means) on rail 140*b* and bracket 162 with nut riding on the screw, as is well known in the art. Motor 160 drives the screw 156 under control of the control means 118. Of course, there are many ways to traverse the carrier along the arm, and to indicate the longitudinal position of the carrier (that is, which track it is reading). Since the specific details of these parts of the invention are not important, they will not be discussed further.

To summarize, this invention involves a single movable arm carrying a radially movable carrier with appropriate transducer means to write and/or read records on the faces of a plurality of rotating discs. The transducer can, by appropriate movement of the arm be placed in operating relation selectively and sequentially with each track on each record on each disc in a group of discs. A second movable arm with carrier and transducer can simultaneously be placed in operating relation with each record on each disc in a second group of discs. The second group of discs can be mounted on the same rotators as the first group of discs if desired. While a first transducer on a first arm is reading (or writing) on one record on one disc in a first group of discs, the second transducer can be in process of positioning to a desired track on a desired disc in the second group of discs. As a special case, where the information being read by the first transducer from a record in the first group is to be recorded on a second disc in the second group, the second transducer can be writing while the first transducer is reading. Also it is possible by proper geometry for a second carrier and transducer can be positioned independently on any disc in the first group.

There are many details of record media optical sources and intensity controls, mirrors, lenses, amplifiers and digital logic, control and processing means which are utilized in my invention. However, the principles of the invention are not restricted to any particular types of such apparatus. Since many different types of such apparatus can be used in practicing the principles of this invention, and since they are well known in the art, they will not be described further. In view of the detailed descriptions of the principles and embodiments of my invention, one skilled in the art will find it possible to devise further embodiments of apparatus, all of which are felt to be part of this invention.

I claim:

1. A multiple disc type digital information storage system comprising:

a. at least two information discs positioned in spaced-apart relation on at least one disc rotator;

b. at least the facing surfaces of each of said discs carrying information records comprising a base sheet attached to said disc and a thin layer of recording material on the outer surface of said base sheet, said material adapted to be modified over a spot area by exposing said spot area to a focused beam of laser energy of selected intensity;

c. at least one transducer arm extending radially between said discs;

d. a source of laser energy, including a single beam of said laser energy conducted radially along said arm;

e. means to focus said beam of laser energy; and f. means to deflect said focused beam so as to make it incident sequentially on a first and a second of said facing surfaces of said recording material;

whereby, by controlling the intensity of said beam and said means to deflect and simultaneously rotating said discs, digital information will be recorded sequentially on said first and second surfaces by said single beam on circular tracks.

2. The multiple disc information system as in claim 1 in which said recording material comprises a Kalvar-like material that has previously been irradiated with ultraviolet light.

3. The multiple disc digital information storage system as in claim 1 including photoelectric means to detect the presence of laser light back scattered from said recording material;

whereby the intensity of said back-scattered light will vary due to the presence or absence of an information spot on said record.

4. The multiple disc digital information system as in claim 3 in which said means to focus, and said photoelectric means together comprise a single information transducer, and said means to deflect comprises means to selectively and successively transduce information from said opposing faces of said discs.

5. The multiple disc digital information system as in claim 1 in which said arm is rotatable about an arm shaft, the axis of which is parallel to the axis of said rotator, and including at least a second rotator parallel to said first rotator and spaced at an equal distance from said arm shaft axis, at least two discs on said second rotator in the same planes as said two discs on said first rotator.

6. The multiple disc digital information system as in claim 5 including more than two spaced discs on each rotator and including means to axially relatively traverse said arm shaft and said rotators, whereby said arm can be sequantially positioned radially between any selected pair of discs on each rotator.

7. The multiple disc information system as in claim 1 in which said recording material comprises a thin layer of opaque material adapted to be removed over the area of said spot by said focused beam of laser energy.

8. The multiple disc digital information system as in claim 7 in which said opaque material comprises a thin layer of evaporizable metal.

9. The multiple disc digital information system as in claim 7 in which said opaque material comprises thin layer of organic material.

10. An information system comprising:

a. a plurality of information records each having at least one information surface, said record surfaces arranged in radial symmetry with respect to an axis;

b. means to store information on said surfaces in the form of patterns of spots;

c. a single optical transducer means for transducing information on said surfaces, said transducer rotatable about said axis; and d. means to place said single transducer in transducing relation with said patterns of spots, sequentially on each of said surfaces.

11. The system as in claim 10 in which said plurality of records surfaces comprise at least one pair of parallel, concentric discs and said surfaces are on opposed facing surfaces of said discs, and including means to place said transducer in operating relation sequentially with each of said opposing surfaces.

* * * * *